March 31, 1964 R. F. ROE ETAL 3,127,594
REMOTE METERING DEVICE
Filed Sept. 15, 1960 3 Sheets-Sheet 1

INVENTORS
ROBERT F. ROE
HENRY STEINHAUER, JR.
BY
Schmieding and Fultz
ATTORNEYS

March 31, 1964    R. F. ROE ETAL    3,127,594
REMOTE METERING DEVICE

Filed Sept. 15, 1960    3 Sheets-Sheet 2

INVENTORS
ROBERT F. ROE
HENRY STEINHAUER, JR.
BY
*Schmieding and Fultz*
ATTORNEYS

3,127,594
REMOTE METERING DEVICE
Robert F. Roe, 35 N. High St., Jackson, Ohio, and Henry Steinhauer, Jr., 14 N. Skyline Drive, Waverly, Ohio, assignors of ten percent to Robert L. Farr, Waverly, Ohio
Filed Sept. 15, 1960, Ser. No. 56,257
6 Claims. (Cl. 340—203)

This invention relates to remote metering apparatus.

In general, the apparatus of the present invention includes a simple and compact pickup device, in the form of a light source and phototransistor, for installation in an existing watt-hour meter. The pickup device, installed in the meter, includes a small light source that directs a small beam of light on the rotary disk common to all rotating vane type watt-hour meters. The surface of the disk is provided with equally spaced radially extending reflective segments and non-reflective black segments. The beam of light is sequentially reflected only by the reflective segments on the disk with the reflected beam being focused upon the lens of a phototransistor.

The phototransistor comprises a portion of a novel pulse generating circuit which produces a voltage pulse suitable for counting.

As another aspect of the present invention the voltage pulses are transmitted to a pulse totalizing circuit which includes a mechanical counter and are totalized. The sum of the total pulses totalized during a unit of time multiplied by a constant gives the power demand for the unit of time.

It is, therefore, an object of the present invention to provide a source generating and totalizing apparatus that is particularly suitable for totalizing extremely high power demands such as are required in atomic energy plants. Since atomic plants require millions of watt-hours, it will, therefore, be understood that such high power must be measured with extreme accuracy in the interest of economy. Since the apparatus of the present invention operates with an error of less than one part in twenty thousand (20,000), errors in calculating high power demands are reduced to a minimum when compared to the energy sensed by the existing watt-hour meters.

It is another object of the present invention to provide a simple compact pickup device and pulse generating circuit adapted for installation in existing and new watt-hour meters.

It is another object of the present invention to provide a pulse generating apparatus that automatically compensates for changes in temperature within the watt-hour meter.

It is another object of the present invention to provide a pulse generating apparatus which accurately produces and transmits voltage pulses at both slow and rapid rates of meter operation.

It is another object of the present invention to provide a pulse generating circuit that operates without a capacitor such that no time is required to reach a predetermined light intensity necessary to trigger the first stage amplifier.

It is another object of the present invention to provide a novel pulse totalizing circuit and apparatus which operates on the novel concept of dividing the hour into predetermined time periods, such as ten six-minute periods, and for alternately delivering pulses to first and second counter means for said predetermined intervals of time.

It is another object of the present invention to provide a novel circuit for totalizing voltage pulses which permit the accurate accumulation of pulses for successive periods of time.

It is still another object of the present invention to provide a novel circuit for totalizing voltage pulses which prevents the introduction of erroneous pulses at the beginning or end of a time period.

Further objects and advantages of the present invention will be apparent from the following description, reference being had to the accompanying drawings wherein a preferred form of embodiment of the invention is clearly shown.

Figure 1:
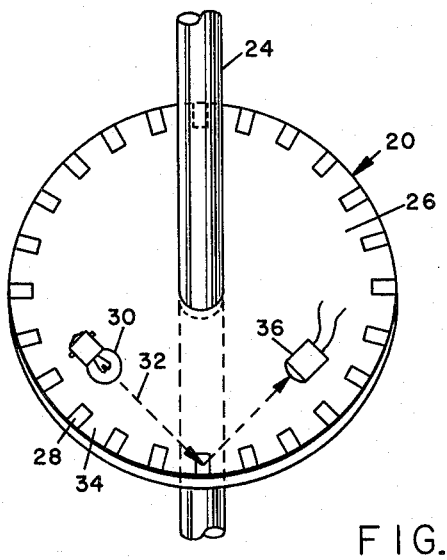
FIG. 1 is a perspective view of a modified rotary disk of the type used in conventional watt-hour meters.
Figure 2:
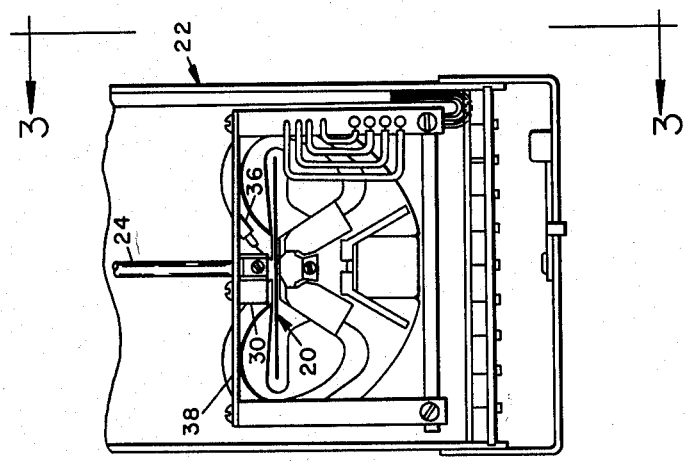
FIG. 2 is a partial front view of a conventional watt-hour meter showing the rotary disk of FIG. 1 installed therein.

Referring in detail to the drawings, FIG. 1 illustrates a rotary disk indicated generally at 20 which is installed in a watt-hour meter indicated generally at 22 in FIG. 2. Disk 20 is mounted on shaft 24 so as to rotate with the meter. The upper surface of the disk includes a plurality of equally spaced black segments 28 separated by a plurality of reflective segments 34.

A light source 30, directs a beam 32 on the periphery of disk 20 and when the beam encounters a reflective segment 34 it is reflected and caused to strike a phototransistor 36.

Figure 4:
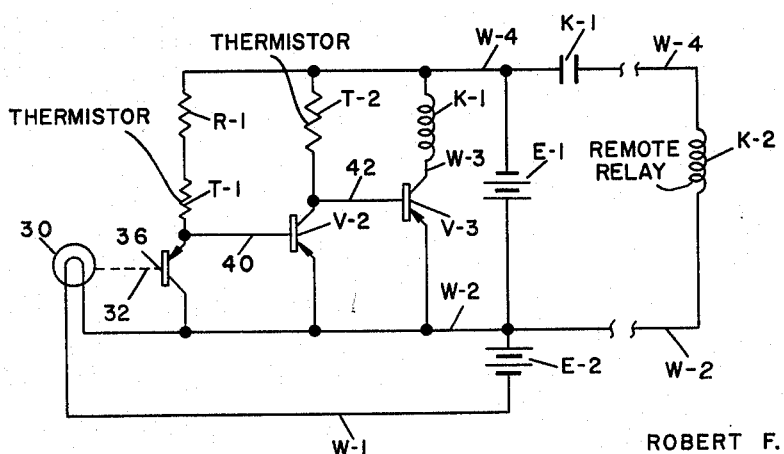
FIG. 4 is a diagrammatic view of a pulse generating circuit constructed in accordance with the present invention.
Figure 3:
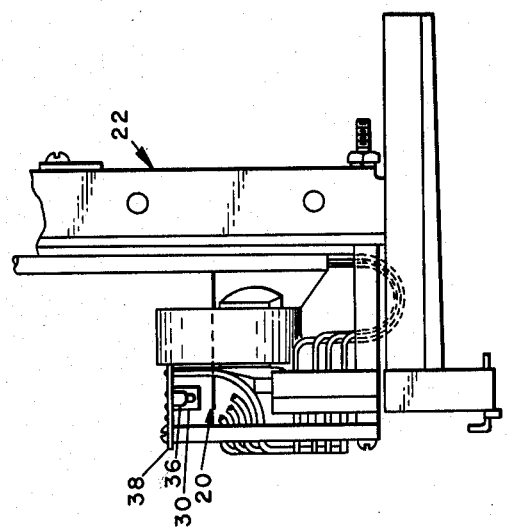
FIG. 3 is a partial side view of the watt-hour meter of FIG. 2, the cover of the meter being removed in FIG. 3.

With reference to FIGS. 2 and 4, light source 30, and phototransistor 36 are mounted on a printed circuit board 38 on which is also mounted resistor R–1, thermistors T–1 and T–2, and transistors V–2 and V–3. The direct current voltage sources E–1 and E–2 and relay K–1 are mounted in a separate mounting case in the vicinity of the watt-hour meter 22.

Wires W–1, W–2, W–3, and W–4 are brought out of the meter case through the existing meter jacks or through an outlet plug mounted in the meter case.

Figure 5:
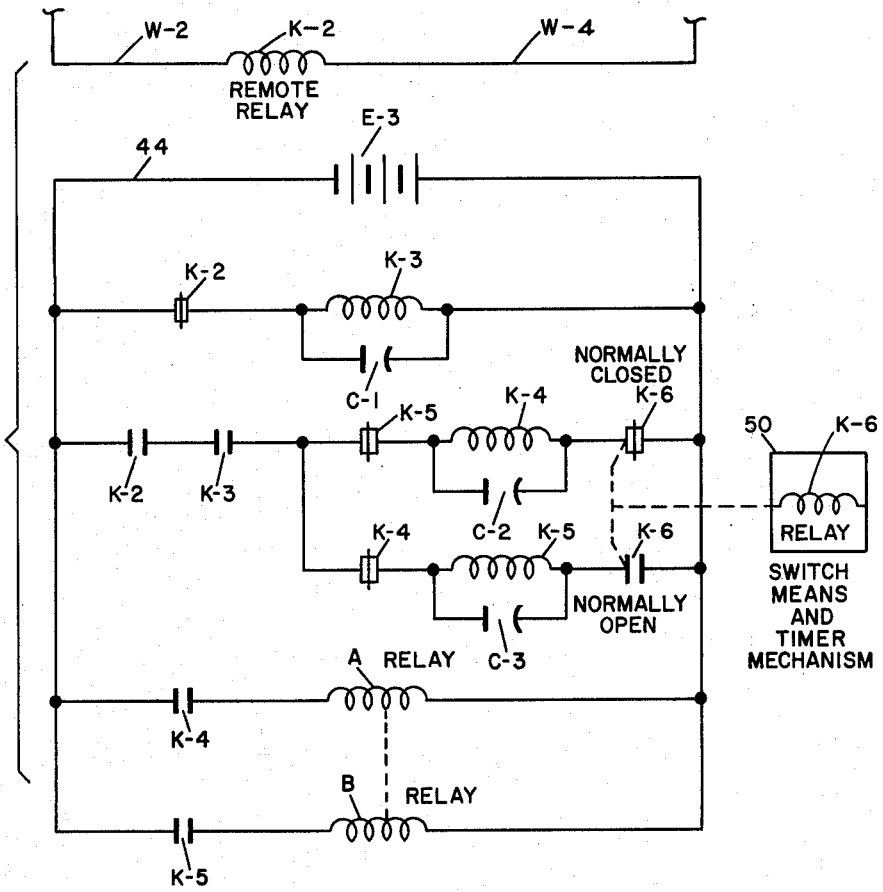
FIG. 5 is a diagrammatic view of a pulse totalizing circuit constructed in accordance with the present invention.

Relay K–2 is usually at a remote location and comprises a portion of the pulse totalizing circuit of FIG. 5.

With reference to the circuit of FIG. 4, the effect of the light pulses on phototransistor 36 is to cause the base voltage across first stage transistor V–2, to pulsate as the black segments successively interrupt the reflection of light to phototransistor 36. The base voltage of the first stage transistor V–2 is connected to phototransistor 36 via wire 40. The pulsating voltage is fed to the base of second stage transistor V–3 via wire 42. This causes the collector voltage to vary from near zero (0) to full B-voltage.

Sufficient voltage flows through the coil of sensitive relay K–1 to permit the relay to be actuated.

With continued reference to FIG. 4, two thermistors T–1 and T–2 are used in the phototransistor circuit and in the collector circuit of first stage transistor V–2 in place of resistors. These thermistors change the operating voltage of the phototransistor and the first stage transistor as to ambient temperature changes so that the operating voltage on the second stage does not change with variations in ambient temperature.

Reference is next made to FIG. 5 which includes relay K–2 shown in FIG. 4, the relay K–2 being located remotely from relay K–1.

The current for the circuit of FIG. 5 is supplied from direct current source E–3.

When the coil of relay K–2, FIG. 4, is deenergized, the normally closed contacts are closed as seen in FIG. 5

This connects coil K-3 with voltage source E-3 via wire 44 whereby a condenser C-1 is charged.

Relays K-4 and K-5 are not energized since the normally open contacts of coil K-2 are open.

When coil K-2 is energized by the pulse generating circuit of FIG. 4, the power to the coil of relay K-3 is opened but the coil remains energized until the voltage on condenser C-1 leaks off through the resistance of coil K-3. During the period of condenser discharge, the normally open contacts of relays K-2 and K-3 are closed and depending on the position of a timer output relay K-6 either the coil of relay K-4 or the coil of relay K-5 is energized and either a condenser C-2 or C-3 is charged.

With continued reference to FIG. 5, the normally closed contacts of either relay K-4 or K-5, are open during a pulse count. This prevents the transmission of pulses to both counter bank A and counter bank B when the position of timer-output relay K-6 is changed to switch counters while a pulse is being delivered.

The positions of the contacts of timer output relay K-6 are reversed at the end of a predetermined time interval by a suitable timer mechanism 50. At the end of the next predetermined time period the incoming pulses are switched back to the other counter.

After a counter has received pulses for a predetermined time period it is read by transferring the stored pulses to a parallel-entry data printer and after the pulses are counted the counter is reset at zero (0).

In a typical installation of the apparatus of the present invention the positions of the contacts of relay K-6 are changed by the previously mentioned timer, not illustrated, every 21,600 cycles of a 60 cycle line, or approximately every six minutes. This establishes the previously mentioned predetermined time interval during which pulses are alternately delivered to counter bank A and to counter bank B. It will, therefore, be understood that the pulses accumulated on a particular counter bank represent the amount of energy (megawatt hours) consumed during the six minute time interval.

While the form of embodiment of the present invention as herein disclosed constitutes a preferred form, it is to be understood that other forms might be adopted, all coming within the scope of the claims which follow:

We claim:

1. A remote metering device comprising, in combination, a pulse generating apparatus including a relay apparatus having a relay coil and a pair of normally open contacts; detector means in circuit with said relay coil; a switch apparatus including a source of electrical energy; a first counter including a first counter coil; a second counter including a second counter coil in parallel with said first counter coil, each of said counter coils being in series with said pair of normally open contacts of said relay; and switch means for sequentially and alternately connecting said first and second counter coils with said sources of electrical energy.

2. The apparatus defined in claim 1 wherein said switch apparatus comprises a second relay apparatus including a second relay coil in series with a normally closed contact of said first relay coil, said second relay coil being in parallel with a capacitor.

3. A remote metering device comprising, in combination, a pulse generating apparatus including a first relay apparatus including a first pair of normally closed contacts, a first pair of normally open contacts and a first relay coil; detector means in circuit with said first coil; a switch apparatus including a second relay apparatus including a second relay coil in series with said first pair of normally closed contacts and a second pair of normally open contacts in series with said first pair of normally open contacts; a third relay apparatus in said switch apparatus and including a third relay coil in series with said first and second pairs of normally open contacts, a third pair of normally closed contacts and a third pair of normally open contacts; a fourth relay apparatus in said switch apparatus and including a fourth relay coil in series with said first and second pair of normally open contacts and said third pair of normally closed contacts, said fourth relay apparatus coil being connected in parallel with said third relay coil and including a fourth pair of normally closed contacts in series with said third relay coil and a fourth pair of normally open contacts; a first counter including a first counter coil in series with said third pair of normally open contacts, a second counter including a second counter coil in series with said fourth pair of normally open contacts; switch means for selectively connecting said third relay coil in series with said fourth pair of normally closed contacts and for selectively connecting said fourth relay coil in series with said third pair of normally closed contacts; switch means for selectively energizing either said third relay coil or said fourth relay coil for selectively energizing either of said counter coils; actuating means for operating said switch means at predetermined time intervals; a first capacitor in parallel with said second relay coil; a second capacitor in parallel with said third relay coil; and a third capacitor in parallel with said fourth relay coil.

4. A remote metering device comprising, in combination, a pulse generating apparatus including a first relay apparatus including a pair of normally open contacts; a light source; a phototransistor including a base arranged to receive light from said light source, means for intermittently interrupting the passage of light from said source to said base; a first stage transistor including a base connected to a collector element in said phototransistor and an emitter element connected to an emitter element in said phototransistor; a second stage transistor including a base connected to the collector element of said first stage transistor and an emitter element connected so said emitter element of said first stage transistor; a sensitive relay apparatus including a sensitive relay coil connected to a collector element of said second stage transistor, said sensitive relay apparatus including a pair of sensitive relay contacts in circuit with said first relay coil of said first relay; a switch apparatus including a source of electrical energy; a first counter including a first counter coil; a second counter including a second counter coil in parallel with said first counter coil, each of said counter coils being in series with said pair of normally open contacts of said first relay apparatus; and switch means for sequentially and alternately connecting said first and second counter coil with said source of electrical energy.

5. The apparatus defined in claim 4 wherein said switch apparatus comprises a second relay apparatus including a second relay coil in series with a normally closed contact of said first relay coil, said second relay coil being in parallel with a capacitor.

6. A remote metering device comprising, in combination, a pulse generating apparatus including a first relay apparatus including a first pair of normally closed contacts, a first pair of normally open contacts and a first coil; a light source; a phototransistor including a base arranged to receive light from said light source, means for intermittently interrupting the passage of light from said source to said base; a first stage transistor including a base connected to a collector element in said phototransistor and an emitter element connected to an emitter element in said phototransistor; a second stage transistor including a base connected to the collector element of said first stage transistor and an emitter element connected to said emitter element of said first stage transistor; a sensitive relay apparatus including a sensitive relay coil connected to a collector element of said second stage transistor, said sensitive relay including a pair of sensitive relay contacts in circuit with said first relay coil of said first relay; a switch apparatus including a second relay apparatus including a second relay coil in series with said first pair of normally closed contacts and a second pair of normally open contacts in series with said first pair of normally open contacts; a third relay apparatus in said switch apparatus and including a third relay coil in series with said first and second pairs of normally open contacts, a third pair of normally closed contacts and a third pair of normally open contacts; a fourth relay apparatus in said switch apparatus and including a fourth relay coil in series with said first and second pairs of normally open contacts and said third pair of normally closed contacts, said fourth relay coil being connected in parallel with said third relay coil and including a fourth pair of normally closed contacts in series with said third relay coil and a fourth pair of normally open contacts; a first counter including a first counter coil in series with said third pair of normally open contacts, a second counter including a second counter coil in series with said fourth pair of normally open contacts; switch means for selectively connecting said third relay coil in series with said fourth pair of normally closed contacts and for selectively connecting said fourth relay coil in series with said third pair of normally closed contacts; actuating means for operating said switch means at predetermined time intervals; a first capacitor in parallel with said second relay coil; a second capacitor in parallel with said third relay coil and a third capacitor in parallel with said fourth relay coil.

References Cited in the file of this patent

UNITED STATES PATENTS

| | | |
|---|---|---|
| 1,878,658 | Aronoff | Sept. 20, 1932 |
| 2,389,275 | Rayner | Nov. 20, 1945 |
| 2,914,685 | McVey | Nov. 24, 1959 |
| 2,948,815 | Willems | Aug. 9, 1960 |